(12) United States Patent
Rachumalla et al.

(10) Patent No.: US 12,046,989 B2
(45) Date of Patent: Jul. 23, 2024

(54) POWER SYSTEM AND RIPPLE VOLTAGE REDUCTION

(71) Applicant: Infineon Technologies Austria AG, Villach (AT)

(72) Inventors: Ramanjaneya Rachumalla, Warwick, RI (US); Paul Sisson, Exeter, RI (US)

(73) Assignee: Infineon Technologies Austria AG, Villach (AT)

( * ) Notice: Subject to any disclaimer, the term of this patent is extended or adjusted under 35 U.S.C. 154(b) by 286 days.

(21) Appl. No.: 17/557,320

(22) Filed: Dec. 21, 2021

(65) Prior Publication Data

US 2023/0198372 A1  Jun. 22, 2023

(51) Int. Cl.
- *H02M 1/08* (2006.01)
- *H02M 1/00* (2006.01)
- *H02M 3/155* (2006.01)

(52) U.S. Cl.
CPC ........... *H02M 1/08* (2013.01); *H02M 1/0009* (2021.05); *H02M 3/155* (2013.01)

(58) Field of Classification Search
CPC ...... H02M 1/08; H02M 1/0009; H02M 3/155; H02M 3/158
See application file for complete search history.

(56) References Cited

U.S. PATENT DOCUMENTS

| | | | |
|---|---|---|---|
| 8,598,856 B1 | 12/2013 | Carroll et al. | |
| 11,757,343 B2 * | 9/2023 | Lewis | H02M 3/158 323/282 |
| 11,804,777 B2 * | 10/2023 | Chen | H02M 3/1584 |
| 2016/0172975 A1 | 6/2016 | Takeya et al. | |
| 2019/0103811 A1 * | 4/2019 | Clavette | H02M 3/158 |
| 2020/0007021 A1 * | 1/2020 | Chen | H02M 3/1588 |

FOREIGN PATENT DOCUMENTS

| | | |
|---|---|---|
| CN | 106787702 A | 5/2017 |
| EP | 1689069 A2 | 8/2006 |
| EP | 2259418 A1 | 12/2010 |

OTHER PUBLICATIONS

Extended European Search Report, EP 22 21 4606, Apr. 24, 2023 pp. 1-10.

* cited by examiner

*Primary Examiner* — Kyle J Moody
(74) *Attorney, Agent, or Firm* — Armis IP Law, LLC

(57) ABSTRACT

During diode emulation mode, a controller controls a magnitude of current supplied by an inductor of a power converter to produce an output voltage that powers a dynamic load. In response to detecting that a magnitude of the current crosses a threshold level, the controller: i) deactivates a first switch such as a low-side switch of the power converter, and ii) starts a timer. The controller monitors a magnitude of the output voltage following deactivation of the first switch. Via the timer, the controller measures a time duration between a time of starting the timer and a trigger event of the output voltage falling below a setpoint reference voltage. In response to the output voltage falling below the setpoint reference, the controller i) selects a setting of a pulse width as a function of the time duration, and ii) activates a second switch, such as a high-side switch of the power converter, for the selected pulse width.

33 Claims, 13 Drawing Sheets

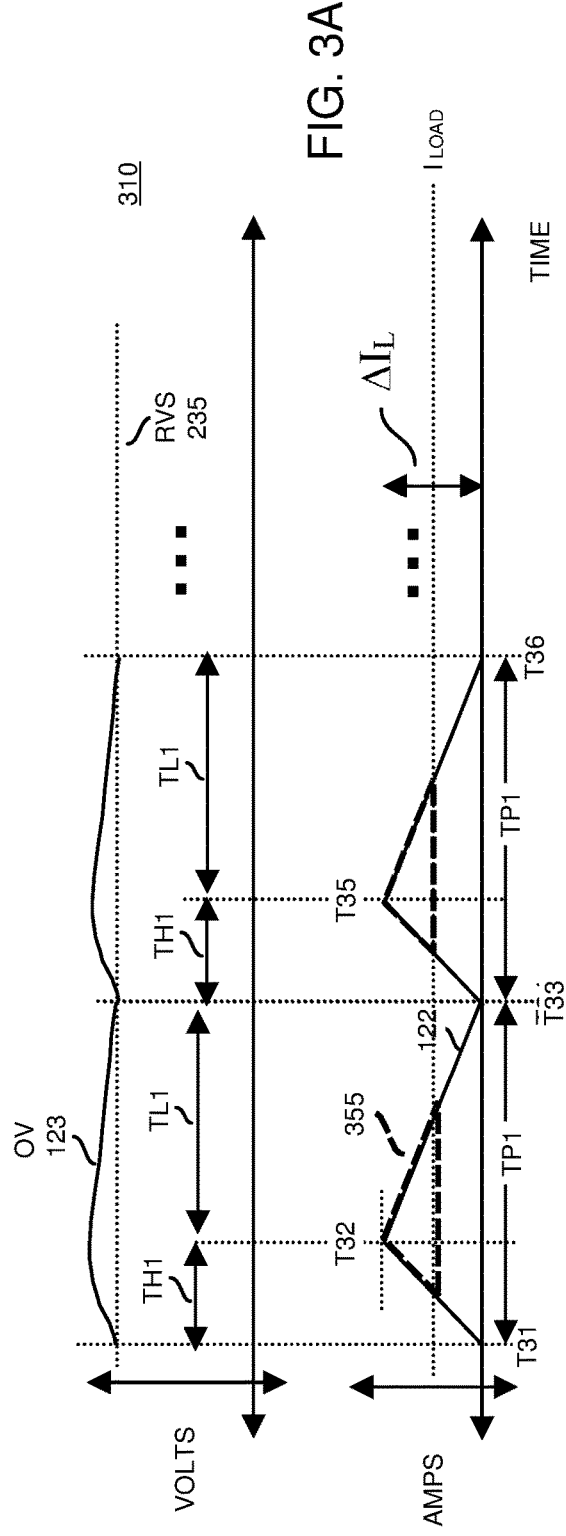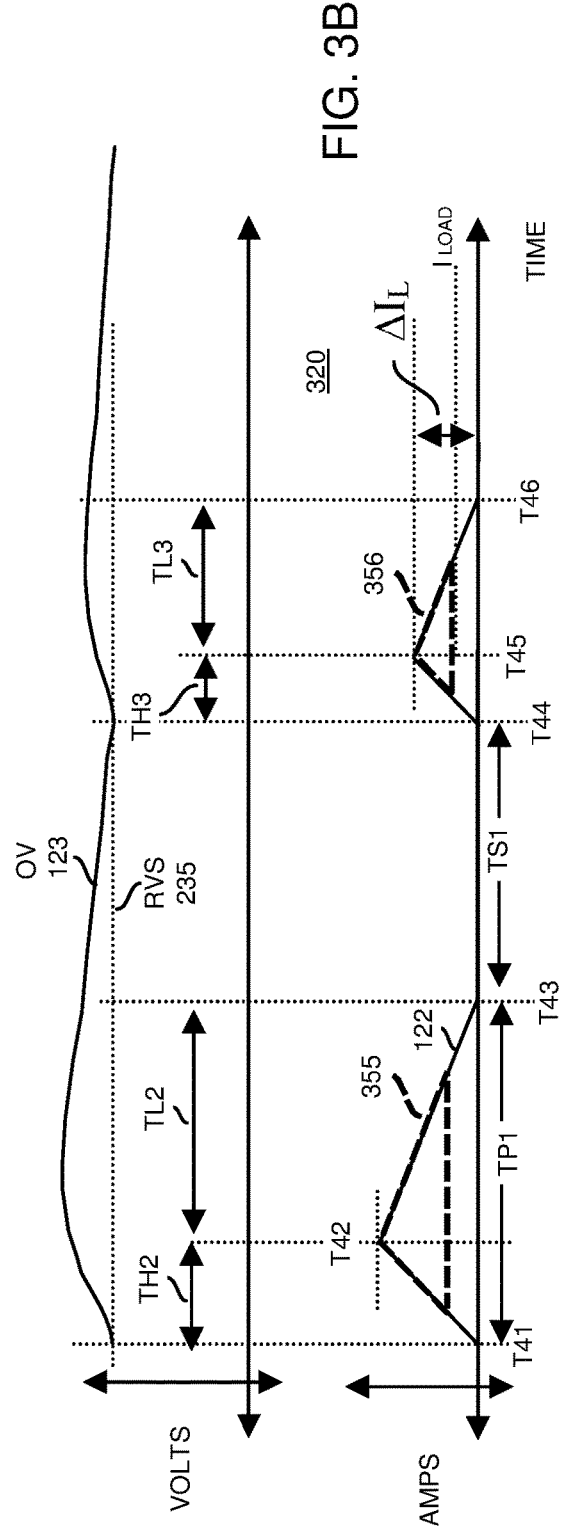

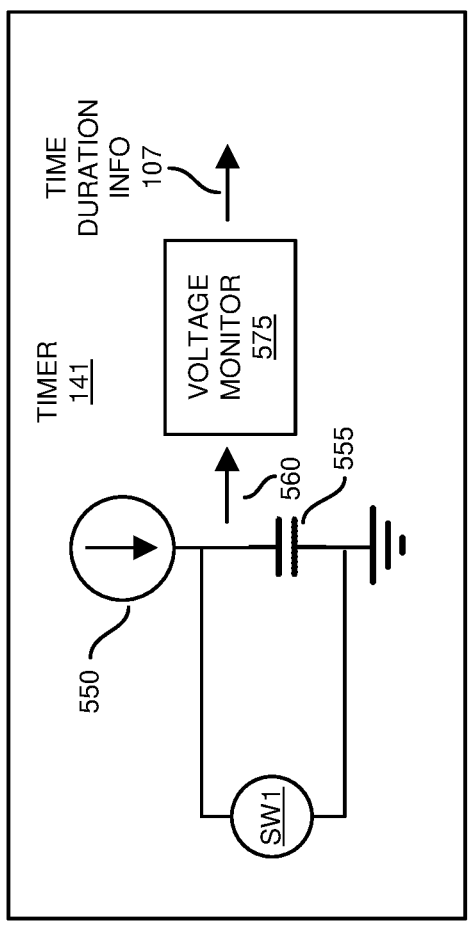
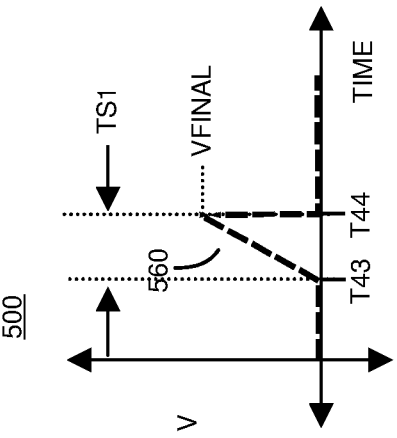
FIG. 5A
FIG. 5B

| PW MAP INFO. 449 | | |
|---|---|---|
| T.D.I | COMP OUTPUT | PW VALUE |
| 0-1.4 uS | ............................ | 100 % |
| 1.4 - 1.8uS | THRES1 = HIGH | 90 % |
| 1.8 - 2.2uS | THRES2 = HIGH | 80 % |
| 2.2 - 2.6 uS | THRES3 = HIGH | 70 % |
| 2.6 - 3.0uS | THRES4 = HIGH | 60 % |
| > 3.0 uS | THRES5 = HIGH | 50 % |

POWER SYSTEM AND RIPPLE VOLTAGE REDUCTION

BACKGROUND

Conventional power supplies may include one or more DC-to-DC converters to produce a respective output voltage to power a load. One type of DC-to-DC converter is a single-stage power converter system. As its name suggests, in the single-stage power converter system, each phase includes a single power converter to convert an input voltage such as 12 V DC (Volts Direct Current) into a respective target output voltage such as 1 volt DC to power a load.

A specific type of power converter is a buck converter. A so-called Constant ON Time (COT) switching buck regulator has a fixed ON-time and uses off-time Pulse Width Modulation (PWM) or frequency modulation to regulate an output voltage.

If desired, a conventional power converter can be configured to operate in a so-called diode emulation mode in which switch circuitry is occasionally pulsed to an ON state to maintain regulation of an output voltage. In general, to maintain an output voltage within a desired range, the buck converter compares the magnitude of a generated output voltage to control respective switch circuitry (such as a control switch and synchronous switch).

BRIEF DESCRIPTION

Implementation of clean energy (or green technology) is very important to reduce human impact on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator or voltage source.

Regardless of whether energy is received from green energy sources or non-green energy sources, it is desirable to make most efficient use of raw energy provided by such sources to reduce our impact on the environment. This disclosure contributes to reducing our carbon footprint and providing better use of energy via more efficient energy conversion.

This disclosure further includes the observation that conventional implementation of a so-called diode emulation mode in a power system suffers from deficiencies. For example, implementation of a diode emulation mode typically results in high ripple (voltage) on an output voltage when a respective load consumes low power. In such an instance, it is more difficult to maintain an output voltage within (DC voltage) regulation due to generation of a high magnitude ripple voltage in the DC output voltage.

In contrast to conventional approaches, implementations herein include novel ways of providing more accurate voltage regulation in a switching power supply during one or more operating conditions.

More specifically, in one implementation, such as during diode emulation mode or other mode, a controller controls a magnitude of current supplied by a power converter to produce an output voltage that powers a dynamic load. For example, the controller can be configured to monitor a magnitude of the current (such as inductor current supplied by an inductor of the power converter). In response to detecting that the magnitude of the current crosses a threshold level (such as drops or equals to zero or other suitable value), the controller may: i) deactivate a first switch such as a low-side switch of the multiple switches, and ii) start a timer. The controller may monitor a magnitude of the output voltage following deactivation of the first switch while the timer keeps track of elapsed time. Via the timer, the controller may measure a time duration between a time of starting the timer and a trigger event of the output voltage falling to or below a setpoint reference voltage. In response to the output voltage falling to or below the setpoint reference, the controller may: i) select a setting of a pulse width (or pulse widths) of the switches as a function of the time duration (elapsed tri-state time duration), and ii) activate the second switch (such as high-side switch) of the multiple switches for the selected pulse width (ON-time duration). This can include determining an appropriate pulse width time of activating high side switch circuitry on a next control cycle such as via converting (such as via mapping or other suitable function) of a magnitude of the elapsed time to an appropriate pulse width duration adjustment value and implementing the pulse width duration adjustment value to control the high side switch circuitry.

Thus, implementations herein include an apparatus comprising a controller operative to: control a magnitude of current supplied by a power converter to produce an output voltage that powers a dynamic load; measure a time duration (such as elapsed time), the time duration being a function of a magnitude of the output voltage; and based on the time duration, control an ON-time of activating a switch of the power converter to increase the magnitude of the current.

In further example, the current may be inductor current. The controller may measure the time duration as a function of the magnitude of the inductor current and/or the magnitude of the output voltage.

In still further examples, such as in a diode emulation mode, the controller may monitor the magnitude of the output voltage and control a pulse width of activating the switch depending on the magnitude of the time duration. In one implementation, as previously discussed, the switch controlled by the controller may be a high-side switch of the power converter.

The apparatus (such as a power system) as discussed herein may include a timer to produce or determine the time duration. The time duration may represent a time difference between a time of starting the timer and a trigger event of the output voltage falling to or below a setpoint reference voltage. The timer may be started in response to detecting a first trigger event such as detecting that a magnitude of the output current from an inductor crosses a threshold value.

In further example implementations, the controller may measure a magnitude of the inductor current during operation of the power converter in a diode emulation mode.

The switch of the power converter may be a first switch; the time duration may represent a difference between a first time instant (first trigger event) of deactivating the second switch and a second time instant (second trigger event) of activating the first switch. The first switch may be a high-side switch of the power converter and the second switch may be a low-side switch of the power converter.

The controller may be configured to control a pulse width duration of activating the switch; the pulse width duration may be selected based on the measured time duration.

Controlled activation of the switch as discussed herein reduces a magnitude of ripple voltage associated with output voltage.

Implementations herein are useful over conventional techniques. For example, controlled timing of one or more switches in a power converter as discussed herein reduces a magnitude of ripple voltage associated with an output voltage such as during diode emulation mode or other power supply mode.

These and other more specific implementations are disclosed in more detail below.

Note that techniques as discussed herein can be implemented in any suitable environment such as multi-phase power supply applications, single phase point of load (a.k.a., POL) power supply applications, etc.

Note further that although implementations as discussed herein are applicable to multi-phase power supply circuits such as those implementing buck converters, DC-DC converter phases, the concepts disclosed herein may be advantageously applied to any other suitable topologies as well as general power supply control applications.

Additionally, note that implementations herein can include computer processor hardware (that executes corresponding software instructions) to carry out and/or support any or all of the method operations disclosed herein. In other words, any of one or more computerized devices or processors (computer processor hardware) can be programmed and/or configured to operate as explained herein to carry out different implementations of the invention.

Yet other implementations herein include software programs to perform the steps and operations summarized above and disclosed in detail below. One such implementation comprises a computer program product that has non-transitory computer-storage media (e.g., memory, disk, flash, . . . ) including computer program instructions and/or logic encoded thereon that, when performed in a computerized device having a processor and corresponding memory, programs the processor to perform any of the operations disclosed herein. Such arrangements are typically provided as software instructions, code, and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), circuit logic, etc. The software or firmware or other such configurations can be installed onto a respective controller circuit to cause the controller circuit (such as logic) to perform the techniques explained herein.

Accordingly, one implementation of the present disclosure is directed to a computer program product that includes a computer readable medium having instructions stored thereon for supporting operations such as controlling one or more phases in a power supply. For example, in one implementation, the instructions, when carried out by computer processor hardware (one or more computer devices, control logic, digital circuitry, etc.), cause the computer processor hardware to: control a magnitude of current supplied by a power converter to produce an output voltage that powers a dynamic load; measure a time duration, the time duration being a function of a magnitude of the output voltage; and based on the time duration, control an ON-time duration of activating a switch of the power converter to increase the magnitude of the current.

Another implementation of the present disclosure is directed to a computer program product that includes a computer readable medium having instructions stored thereon for supporting operations such as controlling one or more phases in a power supply. For example, in one implementation, the instructions, when carried out by computer processor hardware (one or more computer devices, control logic, digital circuitry, etc.), cause the computer processor hardware to: during diode emulation mode, control a magnitude of inductor current supplied by an inductor of a power converter to produce an output voltage that powers a dynamic load; monitor a magnitude of the inductor current; in response to detecting that the magnitude of the inductor current crosses a threshold level: i) deactivate a first switch of the multiple switches, and ii) start a timer; monitor a magnitude of the output voltage following deactivation of the first switch; via the timer, measure a time duration between a time of starting the timer and a trigger event of the output voltage falling below a setpoint reference voltage; and in response to the output voltage falling below the setpoint reference: i) select a setting of a pulse width as a function of the time duration, and ii) activate a second switch of the multiple switches for the selected pulse width.

The ordering of the operations has been added for clarity sake. The operations can be performed in any suitable order.

It is to be understood that the system, method, device, apparatus, logic, etc., as discussed herein can be embodied strictly as hardware (such as analog circuitry, digital circuitry, logic, etc.), as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of implementations herein purposefully does not specify every implementation and/or incrementally novel aspect of the present disclosure or claimed invention(s). Instead, this brief description only presents general implementations and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 3A is an example timing diagram illustrating presence of ripple voltage on a generated output voltage.

FIG. 3B is an example timing diagram illustrating ripple voltage and corresponding control.

FIG. 5A is an example diagram illustrating implementation of a timer.

FIG. 5B is an example graph illustrating a ramp voltage associated with a timer measuring tris-state time of transistors.

Figure 1:
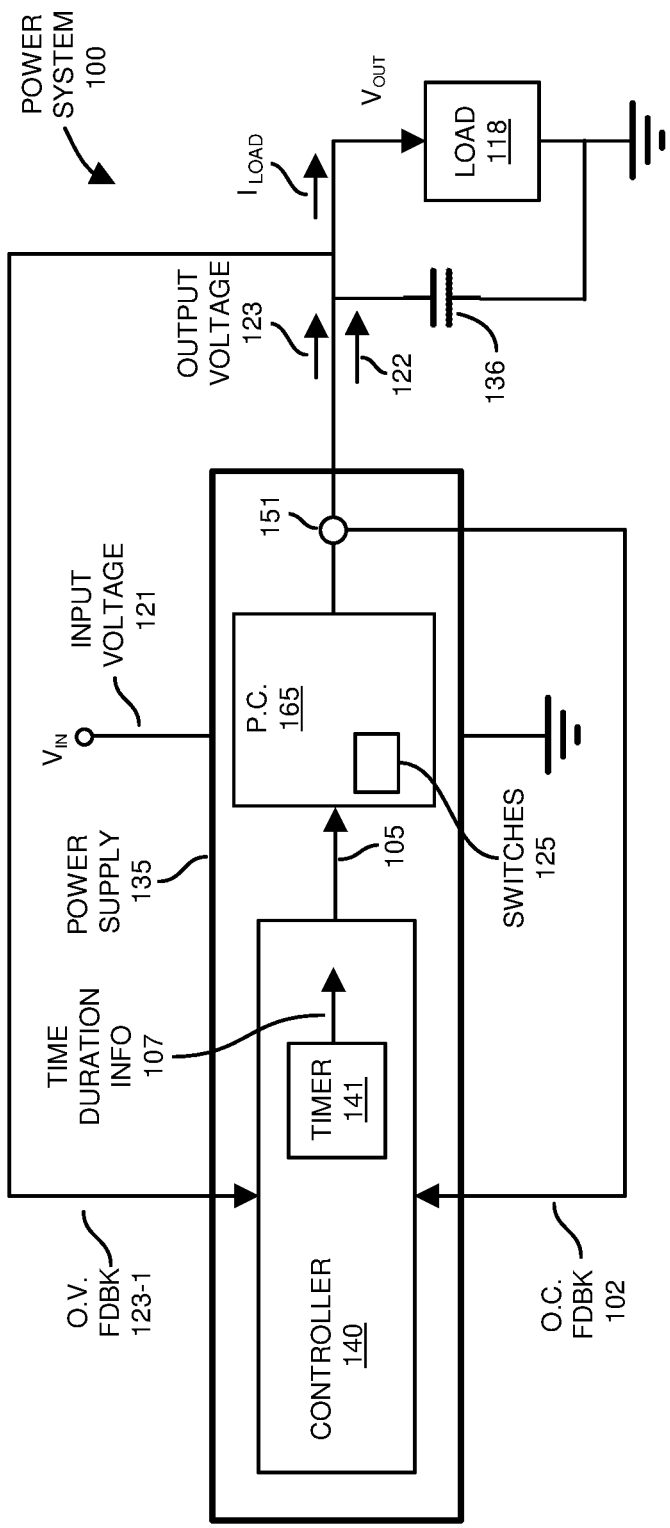
FIG. 1 is an example diagram illustrating implementation of a power supply and control of ripple voltage associated with an output voltage.

The foregoing and other objects, features, and advantages of the invention will be apparent from the following more particular description of preferred implementations herein, as illustrated in the accompanying drawings in which like reference characters refer to the same parts throughout the different views. The drawings are not necessarily to scale, with emphasis instead being placed upon illustrating the implementations, principles, concepts, etc.

DETAILED DESCRIPTION

In conventional power converters (such as buck converters) implementing so-called Constant on time (COT) & Peak current mode (PCM) control algorithm, as the Load current decreases below half the Inductor current ripple part when transitioning from Continuous Conduction mode (CCM) to Diode Emulation mode (DEM), it is observed that the ripple voltage on the output voltage in Diode Emulation mode (DEM) during Zero (or low) load current conditions is four times that in Continuous Conduction mode (CCM) when the load is greater than half the Inductor current ripple. The higher output voltage ripple during diode emulation mode (low load current), or any mode, is undesirable.

For example, at:
800 KHz switching frequency, 12V input voltage, 1.0V output voltage, 200 uF Cout, 190 nH Inductor, CCM mode output voltage ripple is 5 mV (Load current>3 Å)
800 KHz switching frequency, 12V input voltage, 1.0V output voltage, 200 uF Cout, 190 nH Inductor, DEM mode output voltage ripple is 20 mV (Load current=0 Å)

In certain instances, a 20 mVAC output voltage ripple is not acceptable.

One conventional solution to reduce the magnitude of the ripple voltage is implement a larger output capacitance of the respective power converter. This is undesirable because the corresponding power system then requires substantially more space on a circuit board. The additional components also increases a cost of the power system.

Certain implementations herein include monitoring load current by measuring Tri-state time and appropriately adjusting the ON time or Inductor Peak current of a respective power converter, which in turn reduces output voltage ripple. In one implementation, the controller as discussed herein achieves the same DEM (Diode Emulation Mode) output voltage ripple as that in CCM (Continuous Conduction Mode). Implementation of the control functionality as discussed herein provides better conversion efficiency as well as lowers a cost and size associated with implementing the power converter.

The controller functionality as discussed herein includes adjusting (such as reducing) the ON time of a high-side switch (and low-side switch) of power converter as the load current drops, resulting in reduced ripple on the output voltage during diode emulation mode.

Thus, one aspect of power supply control as discussed herein includes reducing the ON-time pulse width in proportion to a measured tri-state time (which is related to an amount of power/current by the load).

Now, more specifically, FIG. 1 is an example diagram illustrating implementation of a power supply and control of ripple voltage associated with an output voltage.

As shown in FIG. 1, power system 100 includes power supply 135 and dynamic load 118. The power supply 135 may include controller 140 and power converter 165. Controller 140 includes timer 141 and current monitor 151. Power converter 165 includes switches 125. Current monitor 151 can be disposed in power converter 165.

As its name suggests, current monitor 151 monitors a magnitude of the output current 122 and produces output current feedback 102 (signal). Output current feedback 102 indicates a magnitude of the output current 122.

In general, during operation, the power supply 135 produces output voltage 123 to power the load 118. The controller 140 monitors one or more parameters such as output voltage feedback 123-1 (such as the output voltage 123 itself or a voltage proportional to the output voltage 123) and/or output current feedback 102 (such as a signal from the current monitor 151 indicating a magnitude of the output current 122 from power converter 165).

Note that each of the different components of the power system 100 (such as controller 140, timer 141, power converter 165, etc.) is typically implemented in the form of circuitry (hardware). However, the instantiation of same may vary depending on the implementation. For example, each of the different components of power system 100 can be configured to include hardware and corresponding executable software to carry out respective functionality as discussed herein.

More specifically, the controller 140 may be configured as controller hardware, controller software, or a combination of controller hardware and controller software; timer 141 can be configured as timer hardware, timer software, or a combination of timer hardware and timer software; and so on.

The controller 140 of the apparatus (such as power system 100) controls a magnitude of current 122 supplied by the power converter 165 to produce an output voltage 123 that powers the dynamic load 118. The controller 140, such as via timer 141, measures a time duration. The measured time duration (as indicated by the time duration information 107) is a function of a magnitude of the output voltage 123 (such as based on the output voltage feedback 123-1) and/or the output current 122 (such as based on the output current feedback 102). As further discussed herein, based on the time duration, the controller 140 controls timing of activating one or more of the switches 125 in power converter 165. As further discussed herein, activation of the one or more switches 125 of the power converter 165 increases the magnitude of the current 122 to maintain a magnitude of the output voltage 123.

Figure 2:
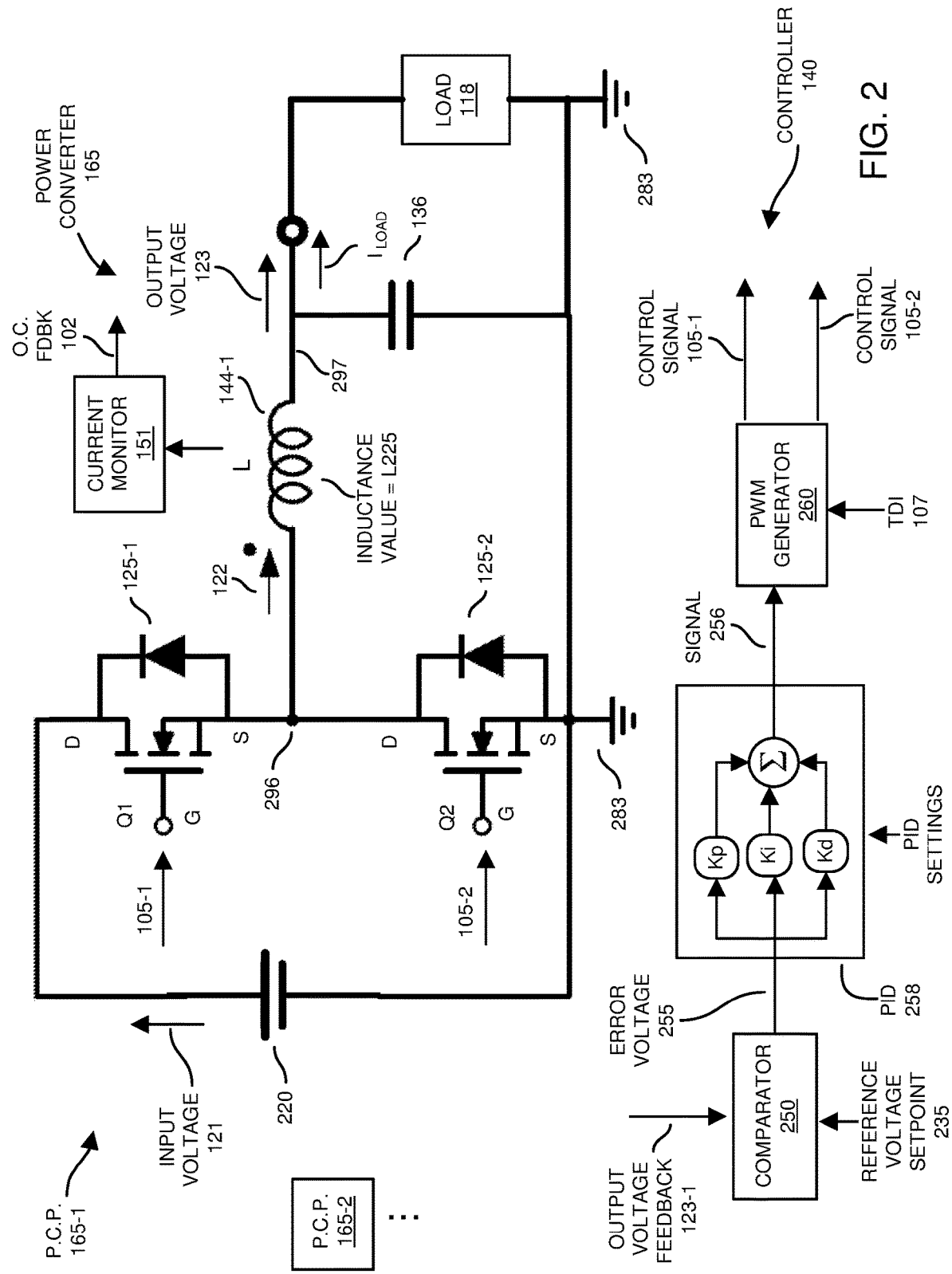
FIG. 2 is an example diagram illustrating a power converter circuit (such as including one or more phases).

FIG. 2 is an example diagram illustrating a power converter circuit (such as including one or more phases) of a power supply.

As previously discussed, the power converter 165 and corresponding power supply 135 can be configured as any suitable type of power converter or power converter system.

The power converter phase 165-1 (instantation of power converter 165 with one or more power converter phases) is configured as a buck converter. Example power converter phase 165-1 includes voltage source 220 (Vin, providing input voltage 121), switch Q1 (a.k.a., high side switch circuitry 125-1), switch Q2 (a.k.a., low side switch circuitry 125-2), inductor 144-1, and output capacitor 136 (such as one or more capacitors).

Switches 125 (Q1, Q2, etc.) can be implemented in any suitable manner. Each of the switches 125 may be implemented as a so-called field effect transistor. Any suitable type of switches 125 can be used to provide switching as discussed herein.

Note that the power supply 100 includes any number of power converter phases (voltage regulators such as power converter 165-1, power converter 165-2, etc.) disposed in parallel to produce the output voltage 123. Each voltage converter such as power converter 165-2 (or voltage regulator) operates in a similar manner as power converter 165-1. The power converters 165 can be operated in or out of phase with respect to each other.

Although the power converter 165-1 in FIG. 2 is shown as a buck converter configuration, note again that the power converter 165 can be instantiated as any suitable type of voltage converter and include any number of phases in parallel, providing regulation of a respective output voltage 123 as described herein.

The switch Q1 of power converter 165-1 is connected in series with switch Q2 between the input voltage source 220 and corresponding reference potential 283.

For example, the drain node (D) of the switch Q1 is connected to the voltage source 220 to receive input voltage 121. The switch controller 140 drives the gate node (G) of switch Q1 with control signal 105-1.

The source node (S) of the switch Q1 is connected to the drain node (D) of the switch Q2 at node 296. The switch controller 140 drives the gate node (G) of switch Q2 with control signal 105-2. The source node (S) of the switch Q2 is connected to reference potential 283.

As previously discussed, the power converter 165-1 further includes inductor 144-1 (such as one or more inductor components). Inductor 144-1 extends from the node 296 to the output capacitor 136 and dynamic load 118.

Via switching of the switches Q1 and Q2 via respective control signal 105-1 (applied to gate G of switch Q1) and control signal 105-2 (applied to gate G of switch Q2), the node 296 coupling the source (S) node of switch Q1 and the drain (D) node of switch Q2 provides output current 122 through the inductor 144, energizing capacitors 136 and resulting in generation of the output voltage 123 and corresponding output current ILOAD powering the load 118. As previously discussed, the current monitor 151 monitors a magnitude of the output current 122 and produces corresponding output current feedback 102.

In general, the magnitude of the current ILOAD is equal to a magnitude of the output current 122 through inductor 144-1. Output capacitor 136 supplies output current ILOAD to power the dynamic load 118 when the output current 122 is zero amperes. Presence of output capacitor 136 reduces a ripple voltage (AC voltage) imposed on a DC component of the output voltage 123. As previously discussed, implementations herein include providing a way to reduce a magnitude of the ripple voltage associated with the output voltage 123 without the need for a large size capacitor 136.

As previously discussed, the controller 140 controls switching of the switches Q1 and Q2 based on one or more feedback parameters. For example, the controller 140 can be configured to receive output voltage feedback signal 123-1 derived from the output voltage 123 supplied to power the load 118 as previously discussed in FIG. 1. The output voltage feedback signal 123-1 can be the output voltage 123 itself or a proportional derivative voltage value thereof using a resistor divider.

Referring again to FIG. 2, via the comparator 250, the controller 140 compares the output voltage feedback signal 123-1 (such as output voltage 123 itself or derivative, or proportional signal) to the reference voltage setpoint 235.

As previously discussed, the reference voltage setpoint 235 is a desired setpoint in which to control a magnitude of the output voltage 123 during load-line regulation implemented by the power supply 135.

A voltage manager in or associated with the dynamic load 118 or other suitable entity may provide control information or feedback (such as a VID value) indicating a desired reference voltage setpoint 235. In other words, the voltage manager can be configured to provide feedback to the controller 140 indicating a magnitude in which to produce the output voltage 123. In such an instance, the feedback such as VID value may be used to produce the reference voltage setpoint 235.

As further shown, the amplifier or comparator 250 produces a respective error voltage 255 based on a difference between the output voltage feedback signal 123-1 and the reference voltage setpoint 235. A magnitude of the error voltage 255 generated by the amplifier or comparator 250 varies depending upon the degree to which the magnitude of the output voltage 123 is in or out of regulation (with respect to the reference voltage setpoint 235).

The controller 140 may include a PID controller (control function). The PID controller control function can be configured to include a P-component (Proportional component), I-component (Integral component), and a D-component (Derivative component) as known in the art to control operation of switches 125 (Q1 and Q2). In voltage mode control, the output of the PID can proportionally control the duty cycle or ON-time of the PWM, and the PWM pulses may be generated at a fixed or variable switching period or frequency. In current mode control, the output of the PID sets the target average current or peak current in the inductor 144-1, and the PWM pulse is dependent on the current sense information, such that the duty cycle or ON time of the PWM is generated based on the PID output and the current sense, with the PWM pulses being generated at fixed or variable switching period or frequency.

The controller 140 may include PID settings (so-called tuning parameters such as gain value Kp applied to the P-component stage, a gain value Ki applied to the I-component stage, and a gain value Kd applied to the D-component stage). Note that the PID settings (gain value Kp, gain value Ki, gain value Kd) may vary depending on the monitored input and conditions associated with producing the output voltage 123.

As further shown, the PWM (Pulse Width Modulation) generator 260 of the controller 140 controls operation of switching the switches Q1 and Q2 based upon the magnitude of the signal 256 (such as control output) from the PID controller.

For example, in general, if the error voltage 255 (and control signal 256) indicates that the output voltage 123 (of the power converter 165-1) becomes less than or equal to (i.e., crosses) a magnitude of the reference voltage setpoint 235, the PWM generator 260 increases a duty cycle or frequency of activating the high side switch Q1 (thus decreasing a duty cycle of activating the low-side switch Q2) in a respective switch control cycle.

Conversely, if the error voltage 256 indicates that the output voltage 123 (of the power converter 165-1) becomes greater than a magnitude of the reference voltage setpoint 235, the PWM generator 260 decreases a duty cycle or frequency of activating the high side switch circuitry Q1 (thus increasing a duty cycle of activating the low-side switch Q2) in a respective switching control cycle.

As is known in the art, the controller 140 controls each of the switches Q1 and Q2 ON and OFF at different times to prevent short-circuiting of the input voltage 121 to the ground reference voltage. For example, for a first portion of the control cycle, when the switch Q1 is activated to an ON state, the switch Q2 is deactivated to an OFF state. Conversely, when the switch Q1 is deactivated to an OFF state, the switch Q2 is activated to an ON state.

Thus, the controller 140 (via PWM generator 260) implements a dead time (both switches Q1 and Q2 OFF) between state ON-OFF and OFF-ON state transitions to prevent shorting of the input voltage 121 to the ground reference.

Via variations in the pulse with modulation (and/or frequency modulation) of controlling the respective switches Q1 and Q2, the controller 140 controls generation of the output voltage 123 such that the output voltage 123 remains within a desired voltage range with respect to the reference voltage setpoint 235.

As further discussed herein, the magnitude of current 122 through the inductor 144-1 increases when the high-side switch Q1 (such as one or more field effect transistor or other suitable component) is ON and low-side switch Q2 (such as one or more field effect transistor or other suitable component) is OFF; the magnitude of current 122 through the inductor 144-1 decreases when the high-side switch Q1 is OFF and Q2 is ON.

As previously discussed, duration a diode emulation mode, the time duration information 107 received from the timer 141 or other suitable entity includes data used to control activation of the switches Q1 and Q2 in one or more control cycles.

FIG. 3A is an example timing diagram illustrating presence of ripple voltage on a generated output voltage.

As illustrated in timing diagram 310, because a magnitude of the current consumed by the dynamic load 118 is above a threshold value (such as greater than half the inductor current ripple), the controller 140 operates the power converter 165 in a so-called continuous conduction mode.

For example, the controller 140 monitors a magnitude of the output voltage 123 with respect to the reference voltage setpoint 235. Because a magnitude of the output voltage 123 falls below the reference voltage setpoint 235 at time T31, the controller 140 activates high side switch circuitry Q1 between time T31 and time T32 (TH1). The controller 140 deactivates the high side switch circuitry Q1 at time T32 and activates low side switch circuitry Q2 between time T32 and time T33 (TL1).

While in the continuous conduction mode, the controller 140 repeats this pattern of sequentially activating high side switch circuitry and low-side switch, with little or no time delay between deactivating the low side switch circuitry and activating the high side switch circuitry such as around time T33, T36, etc.

In such an instance, the ripple voltage on the output voltage 123 is as follows:

$$\text{RIPPLE VOLTAGE} = \Delta V_{out} = \Delta I_L * T_P/8/C_O \text{ (for } I_O \geq \Delta I_L/2) \quad \text{(equation \#1)}$$

where Tp=TH1+TL1, Io=magnitude of the output current 122, Co=capacitance of the output capacitor 136, $\Delta I_L$=peak to peak current through the inductor.

The charge stored in the capacitor 136 (because the dynamic load 118 only consumes current up to ILOAD) is represented by area 355.

FIG. 3B is an example timing diagram illustrating ripple voltage and corresponding control.

In timing diagram 320, in order to control a magnitude of the ripple voltage associated with the output voltage 123, the controller 140 controls a duration (so-called ON-time or TH2, TH3, etc.) of activating the high side switch circuitry Q1 depending on the magnitude of the output current 122 and the magnitude of the output voltage 123.

For example, at or around time T43 in timing diagram 320, the controller 140 detects that the output current 122 drops to zero and the magnitude of the output voltage is greater than the reference voltage setpoint 235. In such an instance, in response to this condition, the controller 140 deactivates the low side switch circuitry Q2 and starts timer 141 at time T43. As its name suggests, the timer 141 keeps track of elapsed time. During a time measurement, the controller 140 monitors a magnitude of the output voltage 123 with respect to the reference voltage setpoint 235 (threshold level). At or around time T44, the controller detects that the magnitude of the output voltage 123 falls below (or crosses) the reference voltage setpoint 235. In such an instance, the controller 140 activates high side switch circuitry Q1 between time T44 and time T45 (TH3) to maintain regulation of the output voltage 123. As further discussed herein, the controller 140 chooses a magnitude of the ON-time (TH3) of the high side switch circuitry Q1 based on a magnitude of the time TS1 as measured by the timer 141. In other words, as further discussed herein, the controller 140 (or other suitable entity) may determine an appropriate ON-time duration TH3 based on the time duration TS1. As further discussed herein, the controller may use the detected time duration value TS1 to determine a pulse width adjustment value to control the pulse width control time TH3 used to activate the high side switch circuitry at tome T44.

Note that when the load current is less than half the Inductor current ripple, Buck converter operate in DEM mode and the output voltage ripple is given by the following formula (charge delivered to Co is highlighted in Blue).

$$\Delta V_{out} = (\Delta IL - IO)^2 * TP/2/\Delta IL/CO \text{ (for } Io < \Delta IL/2)$$

Additional details are further discussed below.

Figure 4:
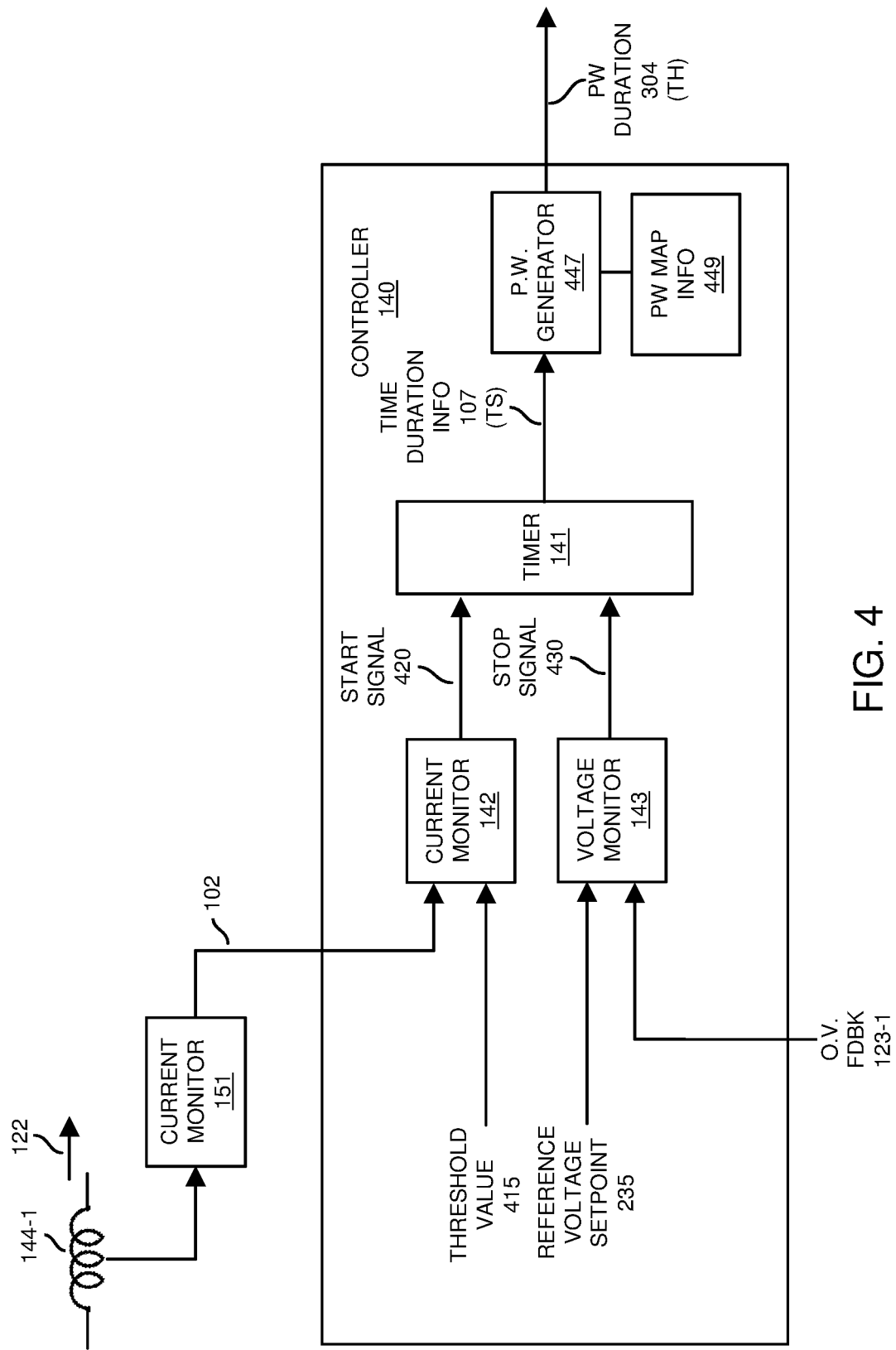
FIG. 4 is an example diagram illustrating details of a controller.

FIG. 4 is an example diagram illustrating details of a controller.

The controller 140 or other suitable entity includes current monitor 142, voltage monitor 143, timer 141, pulse width generator 447, and pulse width map information 449.

As previously discussed, the controller 140 measures the time duration TS1 (FIG. 3) as a function of the magnitude of the inductor current and/or the magnitude of the output voltage.

The current monitor 151 monitors a magnitude of the output current 122 supplied by the inductor 144-1 to the dynamic load 118. As previously discussed, the current monitor 151 produces output current feedback 102 indicating a magnitude of the output current 122.

Current monitor 142 (such as a comparator or other suitable resource) compares the output current feedback 102 to the threshold level 415 (such as zero amps). In response to detecting that the magnitude of the output current 122 is equal to or crosses below the threshold level 415 (such as at time T43 in FIG. 3B), the current monitor 142 generates the timer start signal 420. The timer start signal 420 causes the timer 141 to start tracking elapsed time when the output current feedback 102 is equal to or crosses the threshold level 415.

Additionally, as previously discussed, the voltage monitor 143 (such as a comparator or other suitable resource) compares the output voltage feedback 123-1 to the reference voltage setpoint 235. In response to detecting that the magnitude of the output voltage 123 is equal to or crosses the reference voltage setpoint 235 (such as at time T44 in FIG. 3B), the voltage monitor 143 generates the timer stop signal 430. The timer stop signal 430 causes the timer 141 to stop incrementing when the output voltage feedback 123-1 is equal to or crosses the reference voltage setpoint 235.

The timer 141 outputs time duration information 107. The time duration information 107 represents or includes a time difference (such as TS1 in FIG. 3B) between a first event time of the magnitude of the output current 122 being zero amperes and a second event time of the magnitude of the output voltage 123 being equal to or falling below the reference voltage setpoint 235.

Further in this example implementation, the pulse width generator 447 uses the time duration information 107 generated by the timer 141 to control operation of the switches 125 (such as high side switch circuitry Q1 and low side switch circuitry Q2) in a respective power converter. For example, the pulse width generator 447 can be configured to use pulse width map information 449 as a basis to determine an appropriate pulse width duration 304 (such as TH3) in which to control the high side switch circuitry Q1 in a next control cycle starting at time T44.

An example of an implementation of a timer 141 is more particularly shown in FIG. 5A. An example of the map information 447 is more particularly shown in FIG. 6B.

FIG. 5A is an example diagram illustrating implementation of a timer.

Note that the timer 141 can be implemented in any suitable manner.

The timer 141 may include switch SW1, current source 550, and voltage monitor 575.

When the Load current ILOAD drops below half the Inductor current ripple, the ripple voltage of the output voltage 123 starts to increase above the continuous conduction mode (CCM) ripple voltage. So-called tristate time (TTS) (such as TS1, TS2, TS3, etc.) is the time between two inductor current pulses. Tristate time is a function of Load current, Inductor current ripple & Switching period (TP). If the Inductor current ripple is reduced as the Tristate time increases, then the Output voltage ripple can be reduced.

For example, the tristate time (such as TSx when both switch Q1 and Switch Q2 are OFF, preventing flow of current) is measured in the following way. During Tristate time, a Ramp voltage is generated by charging a capacitor 555 with a constant current source. Peak of the Ramp voltage (signal 560) is proportional to the Tristate time. In one implementation, an array of inverters with varying threshold voltages are used to convert the Ramp voltage into digital code (Analog to digital converter). Using the digital code, an ON time of the high side switch circuitry is controlled and thereby Inductor current ripple and the Output voltage ripple is reduced via control of the pulse width duration during the diode emulation mode.

As discussed herein, inductor current ripple is proportional to ON time of the switches. Output voltage ripple is proportional to square of the ON time due to the fact that Inductor charge pulse amplitude and duration will be affected by the ON time. When the ON time is reduced to 70% of the original, then Output voltage ripple will be reduced to half of the original value. When the ON time is reduced to 50% of the original, then Output voltage ripple will be reduced to quarter of the original value, and so on.

In a more specific example, the timer 141 may include a constant current source 550 that supplies current to the capacitor 555. Controller 140 activates the switch SW1 to discharge the voltage 560 of capacitor 555 when either the high side switch circuitry Q1 or low side switch circuitry Q2 is activated. During a condition when both high side switch circuitry and the low side switch circuitry are OFF, the switch SW1 is open and the current source 550 drives the capacitor 555 with a constant current, producing ramp signal 560 (details in FIG. 5B).

At or around time T43 as previously discussed in FIG. 4, in response to detecting that the magnitude of the output current 122 is equal to or crosses the threshold level 415 (such as zero), the current monitor 142 generates the timer start signal 420. The controller also deactivates both high side switch circuitry and low side switch circuitry. The timer start signal 420 causes the timer 141 to deactivate the switch SW1. This causes a magnitude of the voltage 560 to ramp up as shown in timing diagram 500 of FIG. 5B.

Figures 6A, 6B:
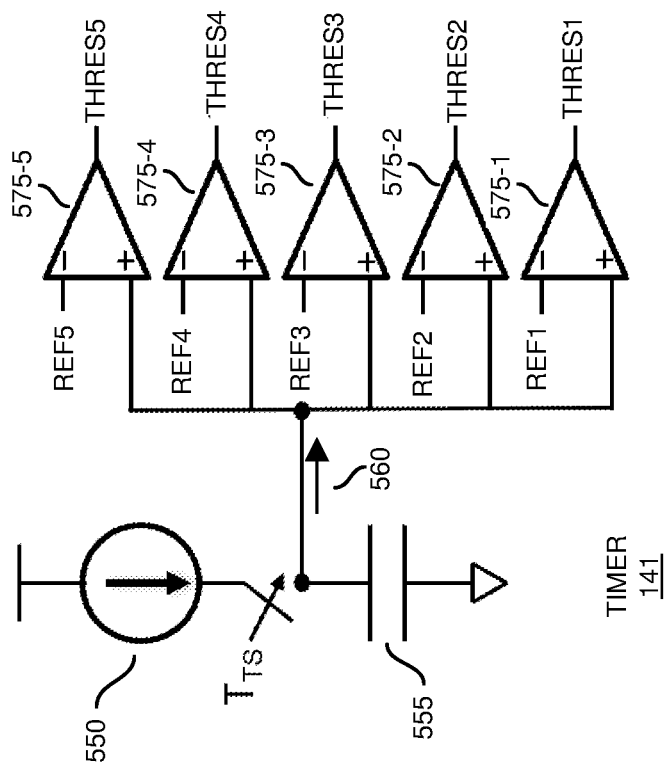
FIG. 6A is an example diagram illustrating implementation of a timer.
FIG. 6B is an example diagram illustrating pulse width mapping information providing conversion of time duration information to pulse width duration information.

Referring again to FIG. 5A, as previously discussed, in response to detecting that the magnitude of the output voltage 123 is equal to or crosses the reference voltage setpoint 235 such as at time T44, the voltage monitor 143 generates the timer stop signal 430. The timer stop signal 430 causes the timer 141 to measure a magnitude of the voltage 560 on capacitor 555, a magnitude of which indicates a duration of time TS1 between time T43 and time T44. Voltage monitor 575 of the timer 141 outputs the final voltage value VFINAL or other value indicating time TS1. Timer 141 uses such information to produce the time duration information 107 indicating time duration TS1. An example of implementing voltage monitor 575 is shown in FIG. 6A.

Referring again to FIG. 5A, note that the time duration TS1 can be captured by the time duration information 107 in any suitable manner. For example, the time duration TS1 can be captured as a voltage, as a count value, etc.

As previously discussed, the timer 141 outputs time duration information 107 representing TS1. The time duration information 107 represents or includes a time difference (such as TS1) between a first event time (T43) of the magnitude of the output current 122 being zero amperes and a second event time (T44) of the magnitude of the output voltage 123 being equal to or falling below the reference voltage setpoint 235.

Thus, in the diode emulation mode, when the Load current (ILOAD) is less than half the Inductor current ripple, the tristate signal goes high between the Inductor current pulses. During Tristate time (such as time duration TS1 of each control cycle), the capacitor 555 is charged using a constant current source 550. One or more output signals of the inverter chain (such as implemented via voltage monitor 575) are used to control at least the ON time of high side switch circuitry and corresponding Inductor peak current, thereby reducing the magnitude of the ripple voltage associated with the output voltage 123.

FIG. 6A is an example diagram illustrating implementation of a timer.

Circuit implementation of the Ripple reduction technique is shown in FIG. 6A. In the diode emulation mode, when the current 122 is less than half the inductor current ripple, the tristate signal goes high between the Inductor current pulses. During Tristate time, the capacitor 555 is charged using a constant current source 550. The signal 560 associated with capacitor 155 is compared to corresponding reference voltages.

For example, the voltage monitor 575-1 (such as a comparator) compares a magnitude of the ramp signal 560 to the reference voltage REF1 (such as 200 mVDC or other suitable value). In response to detecting that the magnitude of the signal 560 is greater than the reference voltage REF1, the output signal THRES1 goes logic high.

In a similar manner, the voltage monitor 575-2 (such as a comparator) compares a magnitude of the ramp signal 560 to the reference voltage REF2 (such as 300 mVDC or other suitable value). In response to detecting that the magnitude of the signal 560 is greater than the reference voltage REF2, the output signal THRES2 goes logic high.

In a similar manner, the voltage monitor 575-3 (such as a comparator) compares a magnitude of the ramp signal 560 to the reference voltage REF3 (such as 400 mVDC or other suitable value). In response to detecting that the magnitude of the signal 560 is greater than the reference voltage REF3, the output signal THRES3 goes logic high.

In a similar manner, the voltage monitor 575-4 (such as a comparator) compares a magnitude of the ramp signal 560 to the reference voltage REF4 (such as 500 mVDC or other suitable value). In response to detecting that the magnitude of the signal 560 is greater than the reference voltage REF4, the output signal THRES4 goes logic high.

In a similar manner, the voltage monitor 575-5 (such as a comparator) compares a magnitude of the ramp signal 560 to the reference voltage REF5 (such as 600 mVDC or other suitable value). In response to detecting that the magnitude of the signal 560 is greater than the reference voltage REF5, the output signal THRES5 goes logic high.

Thus, depending on a peak magnitude of the voltage associated with the signal 560 at time T43 (end of a tris-state time duration), the approximate time of the time duration TS (condition when both high side switch circuitry and low side switch circuitry are OFF) is known depending on how many of the output signals of the volatile memory monitors 575-1, 575-2, 575-3, etc., a re logic high.

As further discussed herein, the outputs of the comparator signals (such as THRES1, THRES2, THRES3, THRES4, THRES5) are used to control the ON time (such as the ON-time duration TH4 in FIG. 3B) and Inductor peak current, thereby reducing the ripple associated with the output voltage 123.

FIG. 6B is an example diagram illustrating pulse width mapping information providing conversion of time duration information to pulse width duration information.

In this example, the pulse width map information 449 includes a look-up table of converting a received time value (such as captured by signals THRES1, THRES2, THRES3, THRES4, THRES5) into a respective pulse width value that is used to control a subsequent time duration of activating the high side switch circuitry Q1 between time T44 and T45 (FIG. 3B).

Thus, it is noted that the pulse width duration for controlling the pulse width of the power converter on a subsequent control cycle is inversely proportional to a magnitude of the received time value as indicated by signals THRES1, THRES2, THRES3, THRES4, THRES5).

For example, if the duration of TS1 for a given cycle of operating in the diode emulation mode is relatively small (such as between zero and 1.4 uS because none of the signals THRES1, THRES2, THRES3, THRES4, THRES5 are logic high), the magnitude of the pulse width (TH3) (se FIG. 3B as well) is chosen as 100% of the time duration of the prior ON-time duration of the high side switch circuitry in the prior cycle.

As another example, if the duration of TS1 for a given cycle of operating in the diode emulation mode is relatively small (such as between 1.4 and 1.8 uS because only the signal THRES1=logic high, and THRES2, THRES3, THRES4, THRES5 are all logic low at time T44), the magnitude of the pulse width (TH3) on a following cycle is chosen as 90% of the time duration of the ON-time duration (TH2) of the high side switch circuitry in the preceding cycle.

As another example, if the duration of TS1 for a given cycle of operating in the diode emulation mode is between 1.8 and 2.2 uS because the signal THRES1=logic high, THRES2=logic high, and each of THRES3, THRES4, THRES5 are all logic low at time T44), the magnitude of the pulse width (TH3) on a following cycle is chosen as 80% of the time duration of the ON-time duration (TH2) of the high side switch circuitry in the preceding cycle.

As another example, if the duration of TS1 for a given cycle of operating in the diode emulation mode is between 2.2 and 2.6 uS because the signal THRES1=logic high, THRES2=logic high, THRES3=logic high, and each of THRES4, THRES5 are all logic low at time T44), the magnitude of the pulse width (TH3) on a following cycle is chosen as 70% of the time duration of the ON-time duration (TH2) of the high side switch circuitry in the preceding cycle.

As another example, if the duration of TS1 for a given cycle of operating in the diode emulation mode is between 2.6 and 3.0 uS because the signal THRES1=logic high, THRES2=logic high, THRES3=logic high, THRES4=logic high, THRES5=logic low at time T44), the magnitude of the pulse width (TH3) on a following cycle is chosen as 60% of the time duration of the ON-time duration (TH2) of the high side switch circuitry in the preceding cycle.

Thus, as the monitored time duration TSn increases (where n in TSn represents the control cycle and TS is the measured tristate time), the controller 140 decreases a magnitude of the ON-time duration of the high side switch circuitry in a next cycle [n+1]. This is because longer durations of TSn indicate that the dynamic load consumes less current. In such an instance, the controller 140 activates the high side switch circuitry Q1 (and low side switch circuitry Q2) for shorter time durations, reducing the ripple voltage of output voltage 123.

Thus, via the timer 141 in FIG. 6A, the settings of the threshold signals THRES1, THRES2, THRES3, THRES4, THRES5 at a time when the output voltage 123 is detects as crossing below the reference voltage setpoint 235 indicates a respective time duration used to determine subsequent ON time of activating the respective high side switch circuitry 125-1 to increase a magnitude of the output current 122 and output voltage 123 powering the load 118.

Note again that that the circuit in FIG. 6A is only an example and that any suitable timer circuit can be used to determine the time duration TS1in FIG. 3B.

Figure 7:
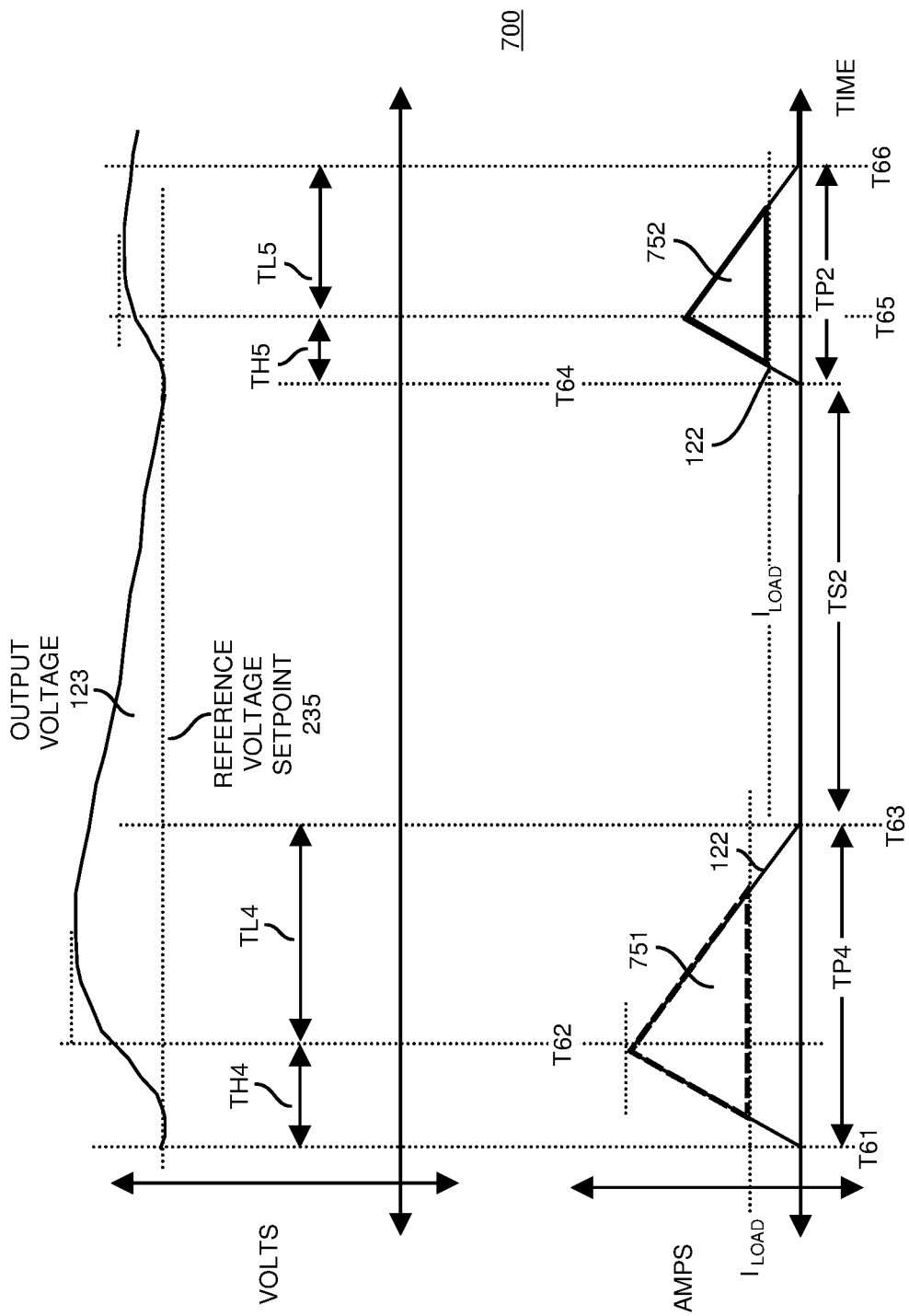
FIG. 7 is an example diagram illustrating pulse width adjustments based on time duration information.

FIG. 7 is an example diagram illustrating pulse width adjustments based on time duration information.

As previously discussed, as the Load current (ILOAD consumed by the dynamic load 118) drops below half the Inductor current ripple, the Tristate time TS starts increasing. The tristate time measuring circuit (such as voltage monitor 575 of timer 141) outputs signals thres1 to thres5 that are set to different states based on a magnitude of the TS (such as TS2) value. In one configuration, the ON time such as pulse width duration in which to activate the high side switch circuitry (and corresponding Inductor peak current) is reduced by 10% (or other suitable amount) every time each of thres1-5 signals associated with the voltage monitor 575 goes high. As the ILOAD current drops much lower, all the thres1 to thres5 signals go high and the ON time is reduced to 50% of the original with respect to the last control cycle. Output voltage ripple associated with the output voltage 123 is proportional to the charge delivered to the Output capacitor 136. Reducing the pulse width of activating the high side switch circuitry when the output voltage 123 drops below a threshold level for longer detected TS values reduces the ripple voltage.

As a further example, in timing diagram 720, in order to control a magnitude of the ripple voltage associated with the output voltage 123, the controller 140 controls a duration of activating the high side switch circuitry Q1 for a subsequent control cycle depending on the magnitude of the output current 122 and the magnitude of the output voltage 123.

For example, the controller 140 activates high side switch circuitry Q1 between time T61 and T62. Controller 140 activates low side switch circuitry between time T62 and time T63. The charge stored in the capacitor 136 (because the dynamic load 118 only consumes current up to ILOAD) is represented by area 751.

At or around time T63, the controller 140 detects that the output current 122 drops to zero and the magnitude of the output voltage 123 is greater than the reference voltage setpoint 235. In such an instance, at or around time T63, the controller 140 deactivates the low side switch circuitry Q2 and starts timer 141. In a manner as previously discussed, the timer 141 keeps track of elapsed time between trigger events. At or around time T64, the controller 140 detects that the magnitude of the output voltage 123 falls below the reference voltage setpoint 235. In such an instance, the controller 140 activates high side switch circuitry Q1 between time T64 and time T65 (pulse width duration TH5). The controller 140 activates low side switch circuitry Q2 between time T65 and time T66 (pulse width duration TL5). As previously discussed, the controller 140 chooses a magnitude of the On-time (pulse width time duration TH5 between T64 and T65) of the high side switch circuitry Q1 based on a magnitude of the time TS2 as measured by the timer 141. Using pulse width map information 449, the controller 140 maps the value TS2 to and appropriate scale factor (such as percentage in pulse width map information 449) and then derives a setting TH5=TH4 multiplied by the determined scale factor associated with time TS2); TH5 is then used to control timing of the high side switch circuitry Q1 between time T64 and time T65. Note that the charge stored in the capacitor 136 (because the dynamic load 118 only consumes current up to ILOAD) is represented by area 752.

As further shown below, if the load current ILOAD decreases even more, the controller 140 further reduces a magnitude of the pulse width applied on a subsequent control cycle.

Figure 8:
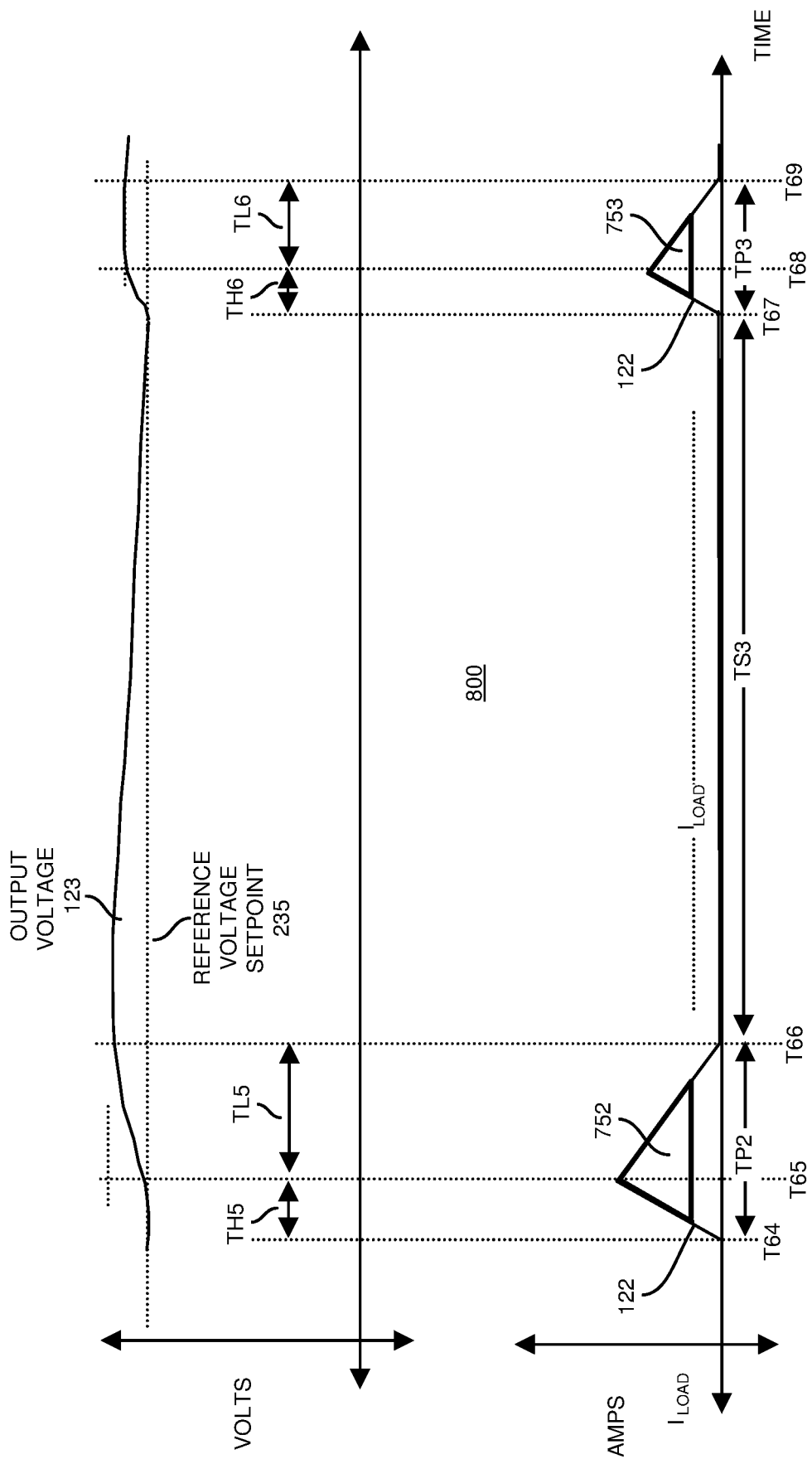
FIG. 8 is an example diagram illustrating pulse width adjustments based on detected time duration information.

FIG. 8 is an example diagram illustrating pulse width adjustments based on time duration information.

As a further example, in timing diagram 820, in order to control a magnitude of the ripple voltage associated with the output voltage 123, the controller 140 controls a duration of activating the high side switch circuitry Q1 for a subsequent control cycle depending on the magnitude of the output current 122 and the magnitude of the output voltage 123 in a manner as previously discussed.

For example, the controller 140 activates high side switch circuitry Q1 between time T64 and T65 in a manner as previously discussed. Controller 140 activates low side switch circuitry between time T65 and time T66. At or around time T66, the controller 140 detects that the output current 122 drops to zero and the magnitude of the output voltage 123 is greater than the reference voltage setpoint 235. In such an instance, at or around time T66, the controller 140 deactivates the low side switch circuitry Q2 and starts timer 141. The timer 141 keeps track of elapsed time between trigger events T66 and T67.

At or around time T67, the controller detects that the magnitude of the output voltage 123 falls below the reference voltage setpoint 235. In such an instance, the controller 140 activates high side switch circuitry Q1 between time T67 and time T68 (via pulse width duration TH6). At or around time T67, the controller 140 chooses a magnitude of the On-time (TH6) of the high side switch circuitry Q1 based on a magnitude of the elapsed time TS3 as measured by the timer 141. The controller 140 activates low side switch circuitry Q2 between time T68 and time T69 (pulse width duration TL6). Using pulse width map information 449, the controller 140 maps the value TS3 to an appropriate percentage that is used to produce the value TH6 (pulse width duration TH6=TH5 multiplied by a determined percentage scale factor in a manner as previously discussed), which is used by the controller 140 to control a time duration of activating the high side switch circuitry Q1 starting at time T67. The charge stored in the capacitor 136 (because the dynamic load 118 only consumes current up to ILOAD) is represented by area 753.

Thus, as the load current ILOAD decreases from one cycle (such as T64 to T66) to the next (such as T66 to T69), the controller 140 further reduces a magnitude of the high side switch circuitry pulse width (i.e., TH6 is less than TH5) applied in a subsequent control cycle. Conversely, as the load current ILOAD increases from one cycle to the next, the controller 140 increases a magnitude of the pulse width applied to high-side switch Q1 on a subsequent control cycle.

Figure 9:
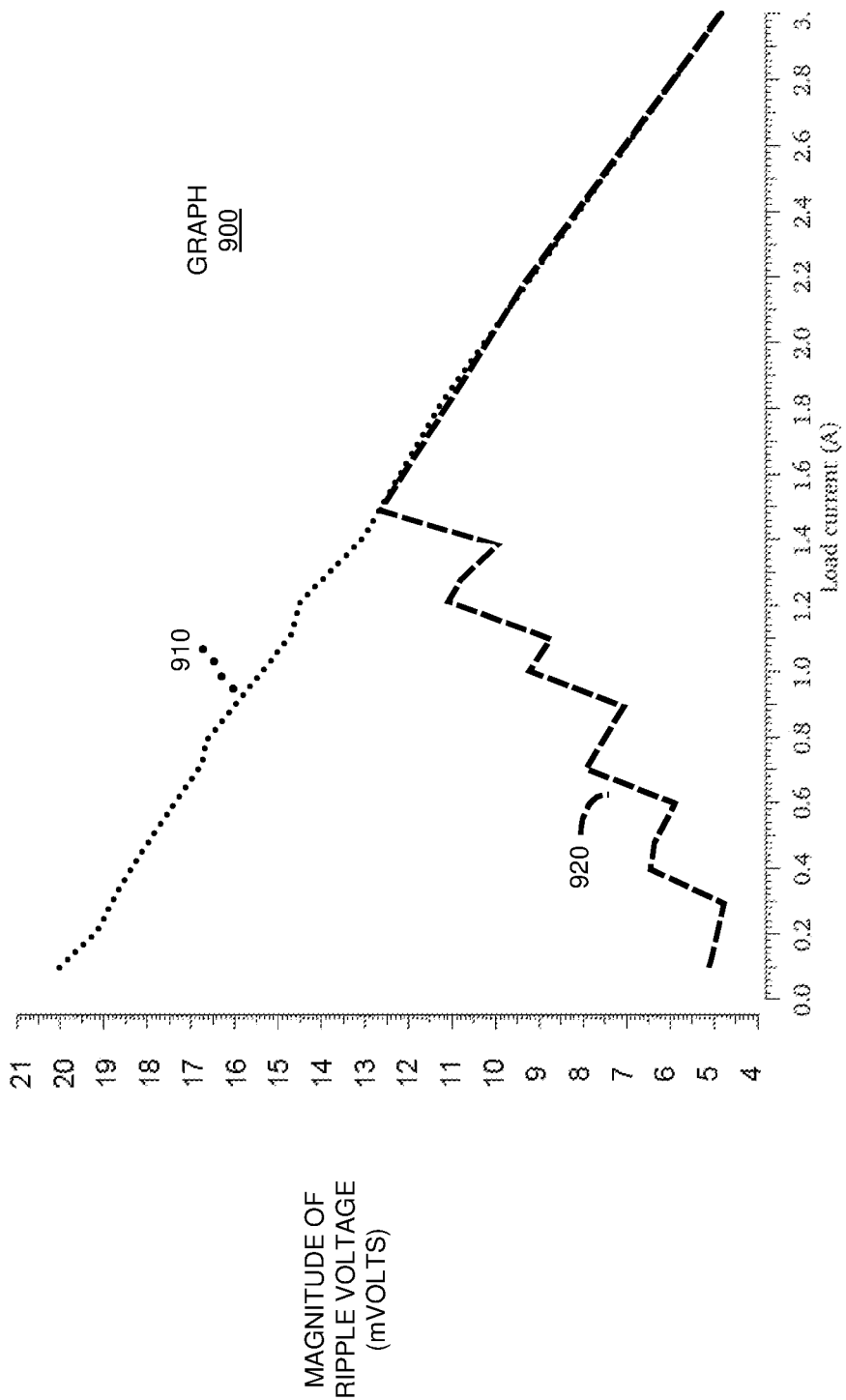
FIG. 9 is an example diagram illustrating ripple voltage magnitude versus load current according to a simulation.

FIG. 9 is an example diagram illustrating theoretical ripple voltage magnitude versus load current.

Assume in this example implementation that the controller 140 operates switches 125 at a switching frequency of 800 KHz, Vin=12 VDC, output voltage 123=1.0 VDC, output capacitance 136=200 uF, inductor 144=190 nH. At a load current 122 of around zero amperes, without implementing pulse width adjustments as discussed herein, line 910 represents the conventional ripple voltage imparted on the output voltage 123, which is around 20 mV. In contrast to this condition, when implementing pulse width adjustments in a manner as discussed herein, the line 920 indicates an amount of ripple voltage (such as 5 mV) imparted on the output voltage 123. Thus, implementations herein provide lower ripple voltage with respect to conventional techniques.

FIG. 9 is an example diagram illustrating theoretical ripple voltage magnitude versus load current.

Assume in this example implementation that the controller 140 operates switches 125 at a switching frequency of 800 KHz, Vin=12 VDC, output voltage 123=1.0 VDC, output capacitance 136=200 uF, inductor 144=190 nH. At a load current 122 of around zero amperes, without implementing pulse width adjustments as discussed herein, line 910 represents the conventional ripple voltage imparted on the output voltage 123, which is around 20 mV. In contrast to this condition, when implementing pulse width adjustments in a manner as discussed herein, the line 920 indicates an amount of ripple voltage (such as 5 mV) imparted on the output voltage 123. Thus, implementations herein provide lower ripple voltage with respect to conventional techniques.

Figure 10:
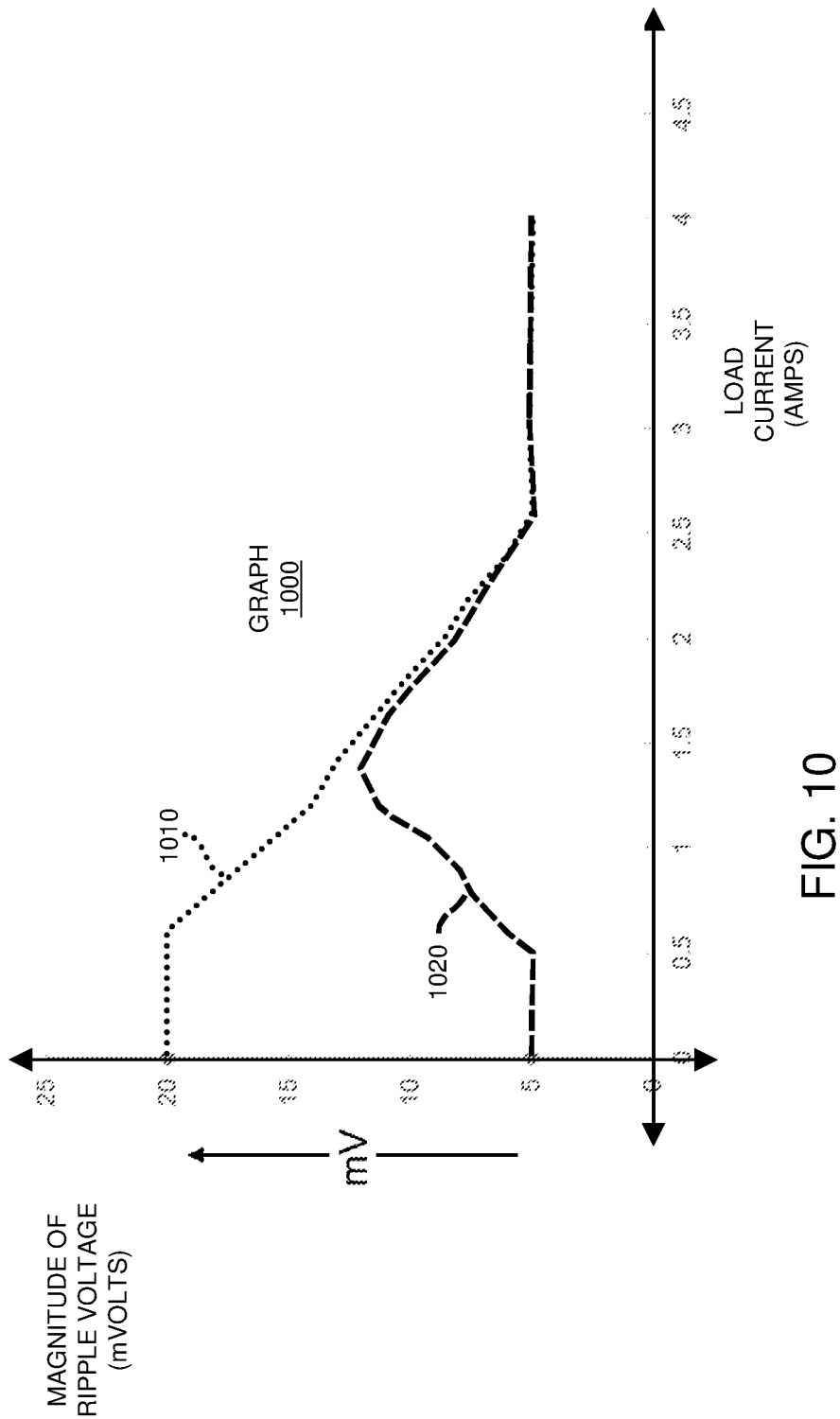
FIG. 10 is an example diagram illustrating ripple voltage magnitude versus load current according to actual circuit implementation.

FIG. 10 is an example diagram illustrating ripple voltage magnitude versus load current according to actual circuit implementation.

Assume in this example implementation that the controller 140 operates switches 125 at a switching frequency of 800 KHz, Vin=12 VDC, output voltage 123=1.0 VDC, output capacitance 136=200 uF, inductor 144=190 nH. At a load current 122 of around zero amperes, without implementing pulse width adjustments as discussed herein, line 1010 represents the conventional ripple voltage imparted on the output voltage 123, which is around 20 mV. In contrast to this condition, when implementing pulse width adjustments in a manner as discussed herein, the line 1020 indicates an amount of ripple voltage (such as 5 mV) imparted on the output voltage 123. Thus, implementations herein provide lower ripple voltage with respect to conventional techniques.

Figure 11:
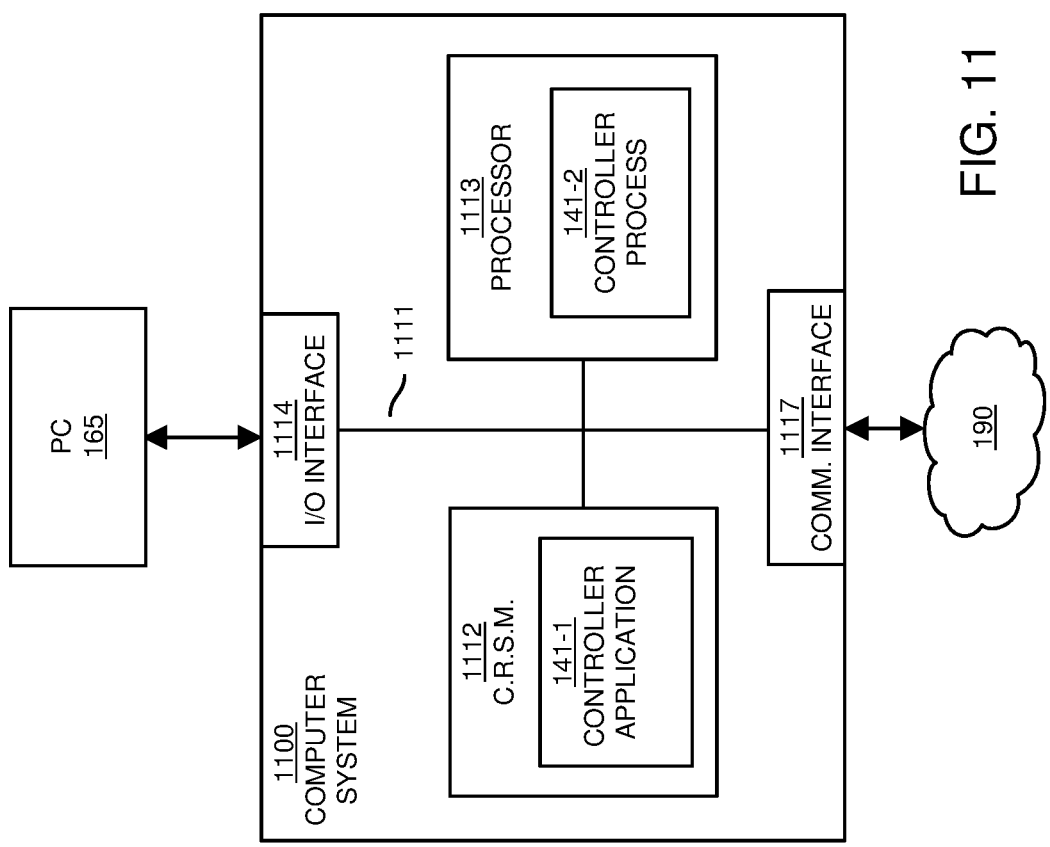
FIG. 11 is an example diagram illustrating computer processor hardware and related software instructions or logic circuit to execute methods.

FIG. 11 is an example block diagram of a computer device for implementing any of the operations as discussed herein.

As shown, computer system 1100 (such as implementing any of one or more resources such as controller 140, timer 141, etc.) of the present example includes an interconnect 1111 that couples computer readable storage media 1112 such as a non-transitory type of media (or hardware storage media) in which digital information can be stored and retrieved, a processor 1113 (e.g., computer processor hardware such as one or more processor devices), I/O interface 1114, and a communications interface 1119.

I/O interface 1114 provides connectivity to any suitable circuitry such as each of phases 110.

Computer readable storage medium 1112 can be any hardware storage resource or device such as memory, optical storage, hard drive, floppy disk, etc. In one implementation, the computer readable storage medium 1112 stores instructions and/or data used by the control application 140-1 to perform any of the operations as described herein.

Further in this example implementation, communications interface 1118 enables the computer system 1100 and processor 1113 to communicate over a resource such as network 193 to retrieve information from remote sources and communicate with other computers.

As shown, computer readable storage media 1112 is encoded with control application 140-1 (e.g., software, firmware, etc.) executed by processor 1113. Control application 140-1 can be configured to include instructions to implement any of the operations as discussed herein.

During operation of one implementation, processor 1113 accesses computer readable storage media 1112 via the use of interconnect 1111 in order to launch, run, execute, interpret or otherwise perform the instructions in control application 140-1 stored on computer readable storage medium 1112.

Execution of the control application 140-1 produces processing functionality such as control process 140-2 in processor 1113. In other words, the control process 140-2 associated with processor 1113 represents one or more aspects of executing control application 140-1 within or upon the processor 1113 in the computer system 1100.

In accordance with different implementations, note that computer system 1100 can be a micro-controller device, logic, hardware processor, hybrid analog/digital circuitry, etc., configured to control a power supply and perform any of the operations as described herein.

Functionality supported by the different resources will now be discussed via flowcharts in FIG. 12. Note that the steps in the flowcharts below can be executed in any suitable order.

Figure 12:
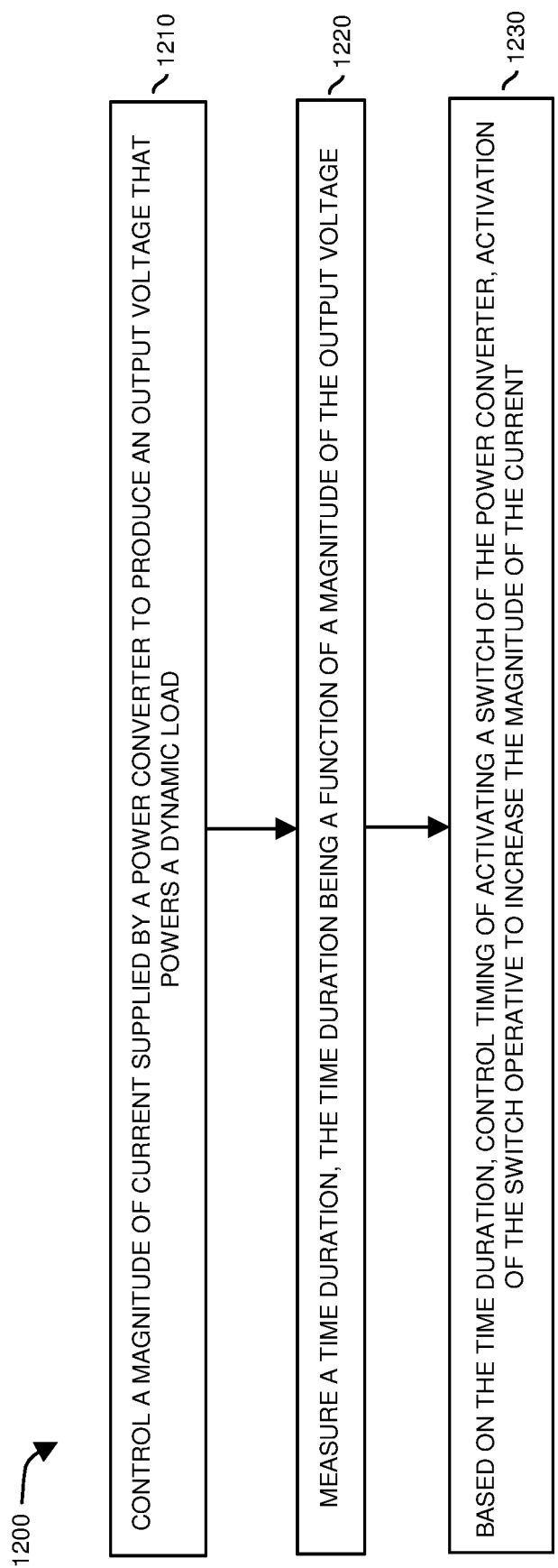
FIG. 12 is an example diagram illustrating a method as discussed herein.

FIG. 12 is a flowchart 1200 illustrating an example method. Note that there will be some overlap with respect to concepts as discussed above.

In processing operation 1210, the controller 140 controls a magnitude of current (such as inductor current 122) supplied by a power converter 165 to produce an output voltage 123 that powers a dynamic load 118.

In processing operation 1220, via timer 141 or other suitable entity, the controller 140 measures a time duration (such as indicated by time duration information 107). The time duration is a function of a magnitude of the output voltage 123 and/or a magnitude of the current through the inductor 144.

In processing operation 1230, based on the time duration as indicated by the time duration information 107, the controller 140 controls an ON-time duration of activating a switch of the power converter 165. Activation of the switch (such as switch 125-1) increases the magnitude of the current 122.

Figure 13:
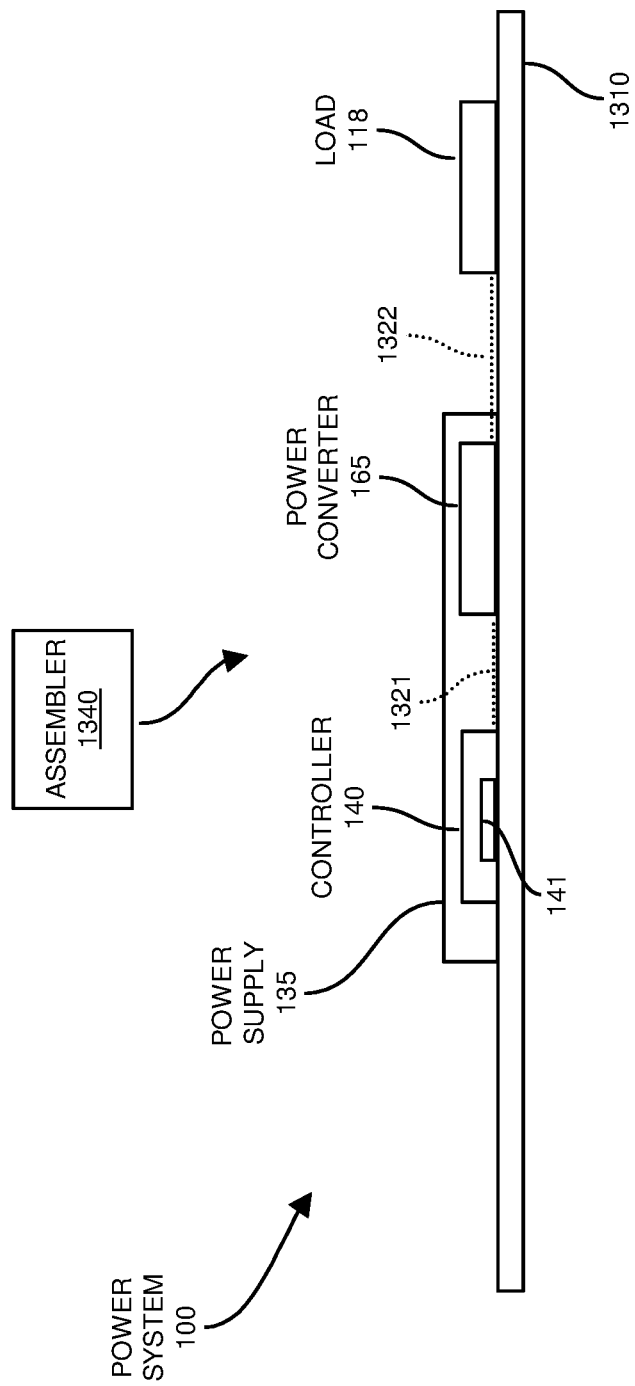
FIG. 13 is an example diagram illustrating fabrication of a power system.

FIG. 13 is an example diagram illustrating assembly of a power converter circuit on a circuit board.

In this example, assembler 1340 (such as fabricator, fabricator equipment, etc.) receives a substrate 1310 (such as a circuit board).

The assembler 1340 affixes (couples) the power supply 135 (and corresponding components such as controller 140, power converter 165, etc.) and dynamic load 118 to the substrate 1310.

Via circuit paths 1321, 1322, etc., (such as one or more traces, electrical conductors, cables, wires, etc.), the assembler 1340 couples the controller 140 and corresponding components to the power converter 135.

Via circuit path 1321 (such as one or more traces, electrical conductors, cables, wires, etc.), the assembler 1340 couples the controller 140 to the power converter 165. Note that components such as the controller 140, power converter 165, and corresponding components such as timer 141, etc., associated with the power supply 135 can be affixed or coupled to the substrate 1310 in any suitable manner. For example, one or more of the components in power system 100 and each of the corresponding components can be soldered to the substrate, inserted into respective sockets disposed on the substrate 1310, etc.

Note further that the substrate 1310 is optional. Circuit paths 1321, 1322, etc., may be disposed in cables providing connectivity between the different components such as between power supply 135 and the load 118.

The dynamic load 118 is disposed on its own substrate independent of substrate 1310; the substrate of the dynamic load 118 is directly or indirectly connected to the substrate 1310. The timer 141, controller 140, or any portion of the power supply 135 can be disposed on a standalone smaller board plugged into a socket of the substrate 1310.

In further example implementations, via one or more circuit paths 1322 (such as one or more traces, cables, connectors, wires, conductors, electrically conductive paths, etc.), the assembler 1340 couples the power converter 165 to the load 118. The circuit path 1322 conveys the output voltage 123 (and corresponding output current 122) generated from the power converter 165 to the load 118.

Accordingly, implementations herein include a system comprising: a substrate 1310 (such as a circuit board, standalone board, mother board, standalone board destined to be coupled to a mother board, host, etc.); a timer 141; a power converter 165 including corresponding components as described herein; and a dynamic load 118. As previously discussed, the dynamic load 118 is powered based on conveyance of output voltage 123 and corresponding current conveyed over one or more circuit paths 1322 from the power converter 165 to the dynamic load 118.

Note that the dynamic load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1310 or disposed at a remote location.

Note again that techniques herein are well suited for use in power converter circuit applications such as those that convert an input voltage into an output voltage. However, it should be noted that implementations herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred implementations thereof, it will be understood by those skilled in the art that various changes in form and details may be made therein without departing from the spirit and scope of the present application as defined by the appended claims. Such variations are intended to be covered by the scope of this present application. As such, the foregoing description of implementations of the present application is not intended to be limiting. Rather, any limitations to the invention are presented in the following claims.

We claim:

1. An apparatus comprising:
a controller operative to:
control a magnitude of current supplied through an inductor of a power converter to produce an output voltage that powers a dynamic load, the power converter including a first switch and a second switch operative to control the magnitude of the current through the inductor;
measure a time duration in which the first switch and the second switch are deactivated to an OFF-state in a first control cycle, the time duration being a function of a magnitude of the output voltage; and
based on the time duration, control an ON time of activating the first switch of the power converter in a second control cycle, activation of the first switch operative to increase the magnitude of the current supplied to the dynamic load.

2. The apparatus as in claim 1,
wherein the controller is further operative to: measure the time duration as a function of the magnitude of the current and the magnitude of the output voltage.

3. The apparatus as in claim 1, wherein the controller is further operative to monitor the magnitude of the output voltage; and
control a pulse width of activating the first switch depending on a magnitude of the time duration.

4. The apparatus as in claim 3, wherein the first switch is a high-side switch of the power converter.

5. The apparatus as in claim 1 further comprising:
a timer operative to produce the time duration; and
wherein the time duration represents a time difference between a time of starting the timer and a trigger event of the output voltage falling below a setpoint reference voltage.

6. The apparatus as in claim 5, wherein the timer is started in response to detecting the magnitude of the current crossing a threshold value.

7. The apparatus as in claim 1, wherein the controller is operative to measure the magnitude of the current during operation of the power converter in a diode emulation mode.

8. The method as in claim 1,
wherein the measured time duration represents a difference between a first time instant of deactivating the second switch in the first cycle and a second time instant of activating the first switch in the second control cycle.

9. The method as in claim 8, wherein the first switch is a high-side switch of the power converter and the second switch is a low-side switch of the power converter.

10. The method as in claim 1, wherein activation of the first switch in the second control cycle for the ON time reduces a magnitude of ripple voltage associated with the output voltage with respect to the magnitude of the ripple voltage in the first control cycle.

11. The method as in claim 1, wherein the controller is further operative to:

control a pulse width duration of activating the first switch, the pulse width duration selected based on the measured time duration.

12. The apparatus as in claim 1 further comprising:
a timer operative to measure the time duration between a start event and a stop event;
wherein the start event is detection of the magnitude of the current crossing a current threshold level; and
wherein the stop event is detection of the magnitude of the output voltage decreasing to a voltage threshold level.

13. The apparatus as in claim 12, wherein the current threshold level is zero amps.

14. The apparatus as in claim 12, wherein the controller is further operative to:
convert a magnitude of the measured time duration to a scale factor value; and
produce a time value equal to the scale factor value multiplied by a time duration of activating the first switch in the first control cycle.

15. The apparatus as in claim 14, wherein a magnitude of the scale factor value is inversely proportional to the magnitude of the measured time duration.

16. The apparatus as in claim 14, wherein the first switch is high side switch circuitry connected between an input voltage source and a first node of the inductor; and
wherein the second switch is low side switch circuitry connected between the first node of the inductor and a reference voltage source.

17. The apparatus as in claim 16, wherein the controller is further operative to control the ON time of activating the first switch in the second control cycle by an amount as specified by the produced time value, the second control cycle occurring subsequent to the first control cycle.

18. The apparatus as in claim 16, wherein the controller is further operative to activate the first switch of the power converter in the second control cycle by an amount as specified by the produced time value starting at a time of the stop event.

19. The apparatus as in claim 1, wherein the control of the ON time of activating the first switch in the second control cycle based on the measured time duration is operative to reduce a magnitude of a respective ripple voltage associated with the output voltage.

20. The apparatus as in claim 1, wherein the ON time of activating the first switch in the second control cycle is derived based at least in part on an ON time of activating the first switch of the power converter in the first control cycle.

21. The apparatus as in claim 1, wherein the ON time of activating the first switch in the second control cycle is determined based on multiplying a scale factor value by an amount of time of activating the first switch in the first control cycle, the scale factor value derived from a magnitude of the measured time duration in which the first switch and second switch are deactivated to the OFF-state in the first control cycle.

22. A method comprising:
controlling a magnitude of current supplied through an inductor of a power converter to produce an output voltage that powers a dynamic load, the power converter including a first switch and a second switch operative to control the magnitude of the current through the inductor;
measuring a time duration in which the first switch and the second switch are deactivated to an OFF-state in a first control cycle, the time duration being a function of a magnitude of the output voltage; and
based on the time duration, controlling an ON-time of activating the first switch of the power converter in a second control cycle to increase the magnitude of the current.

23. The method as in claim 22,
wherein measuring the time duration includes: measuring the time duration as a function of the magnitude of the current through the inductor and the magnitude of the output voltage.

24. The method as in claim 22 further comprising:
monitoring the magnitude of the output voltage; and
controlling a pulse width of activating the first switch depending on the magnitude of the time duration.

25. The method as in claim 24, wherein the first switch is a high-side switch of the power converter.

26. The method as in claim 22, wherein the time duration represents a time difference between a time of starting a timer and a trigger event of the output voltage falling below a setpoint reference voltage.

27. The method as in claim 26 further comprising:
starting the timer in response to detecting a magnitude of the current crossing a threshold value.

28. The method as in claim 22 further comprising:
measuring the magnitude of the current during operation of the power converter in a diode emulation mode.

29. The method as in claim 22,
wherein the time duration represents a difference between a first time instant of deactivating the second switch in the power converter and a second time instant of activating the first switch in the power converter in the second control cycle.

30. The method as in claim 29, wherein the first switch is a high-side switch of the power converter and the second switch is a low-side switch of the power converter.

31. The method as in claim 22, wherein activation of the first switch in the second control cycle is operative to reduce a magnitude of ripple voltage associated with the output voltage with respect to the magnitude of the ripple voltage in the first control cycle.

32. The method as in claim 22 further comprising:
controlling a pulse width duration of activating the first switch, the pulse width duration selected based on the measured time duration.

33. Computer-readable storage hardware having instructions stored thereon, the instructions, when carried out by computer processor hardware, cause the computer processor hardware to:
control a magnitude of current supplied by an inductor of a power converter to produce an output voltage that powers a dynamic load, the power converter including a first switch and a second switch operative to control the magnitude of the current through the inductor;
measure a time duration in which the first switch and the second switch are deactivated to an OFF-state in a first control cycle, the time duration being a function of a magnitude of the current and a magnitude of the output voltage; and
based on the time duration, control an ON-time of activating the first switch of the power converter in a second control cycle to increase the magnitude of the current.

\* \* \* \* \*